United States Patent

Rosen et al.

[15] 3,692,274

[45] Sept. 19, 1972

[54] VALVE FOR PNEUMATIC MOTOR

[72] Inventors: Samuel R. Rosen, Lorain; Alvin A. Rood, Westlake; Donald R. Scharf, Amherst, all of Ohio

[73] Assignee: Nordson Corporation, Amherst, Ohio

[22] Filed: May 17, 1971

[21] Appl. No.: 143,812

Related U.S. Application Data

[62] Division of Ser. No. 809,235, March 21, 1969, Pat. No. 3,635,125.

[52] U.S. Cl. ................................................251/75
[51] Int. Cl. .............................................F16k 31/44
[58] Field of Search.......267/158, 159, 160, 161, 162; 251/75; 91/346, 306

[56] References Cited

UNITED STATES PATENTS

| | | | |
|---|---|---|---|
| 1,603,005 | 10/1926 | Flam | 251/75 |
| 2,671,632 | 3/1954 | Palmer | 251/75 X |
| 2,893,416 | 7/1959 | Hegstad | 251/75 X |
| 3,474,962 | 10/1969 | Visos | 251/75 X |
| 3,489,254 | 1/1970 | Sparrow | 251/75 X |
| 1,719,687 | 1/1929 | Browne | 251/75 |
| 3,218,935 | 11/1965 | York et al. | 251/75 |

FOREIGN PATENTS OR APPLICATIONS

| | | | |
|---|---|---|---|
| 136,057 | 1/1950 | Austria | 91/346 |

*Primary Examiner*—Henry T. Klinksiek
*Attorney*—Bosworth, Sessions, Herrstrom

[57] ABSTRACT

A hydraulic pump and double acting air motor therefor including means for controlling the inlet and exhaust of air to and from the opposite sides of the piston in the air cylinder. A pilot valve operated by the air piston controls one operating valve for the cylinder and a pilot relay valve. The pilot relay valve controls another operating valve which is in reverse phase with respect to the first operating valve. The piston operated pilot valve has a snap action feature so that the pilot valve, the pilot relay valve and the operating valves all reverse condition abruptly with a minimum dwell to provide a smoother power transmission.

2 Claims, 12 Drawing Figures

INVENTORS.
SAMUEL R. ROSEN,
ALVIN A. ROOD &
DONALD R. SCHARF
BY Bosworth, Sessions,
Herrstrom & Cain
ATTORNEYS

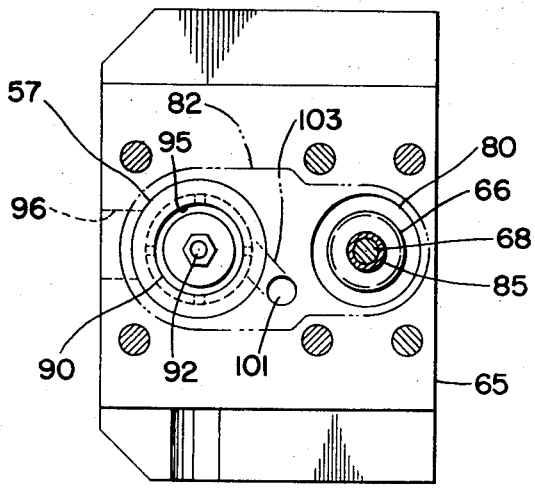
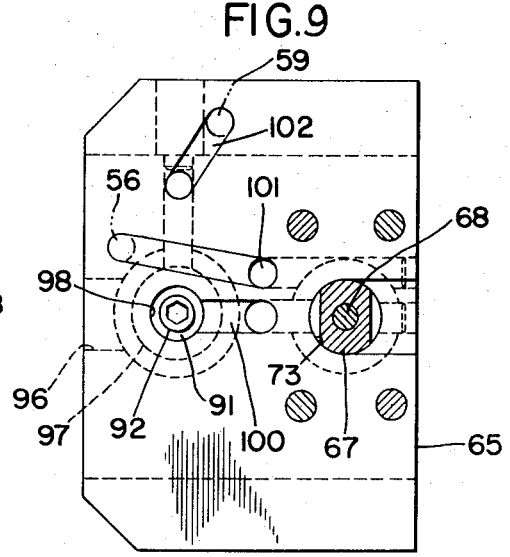
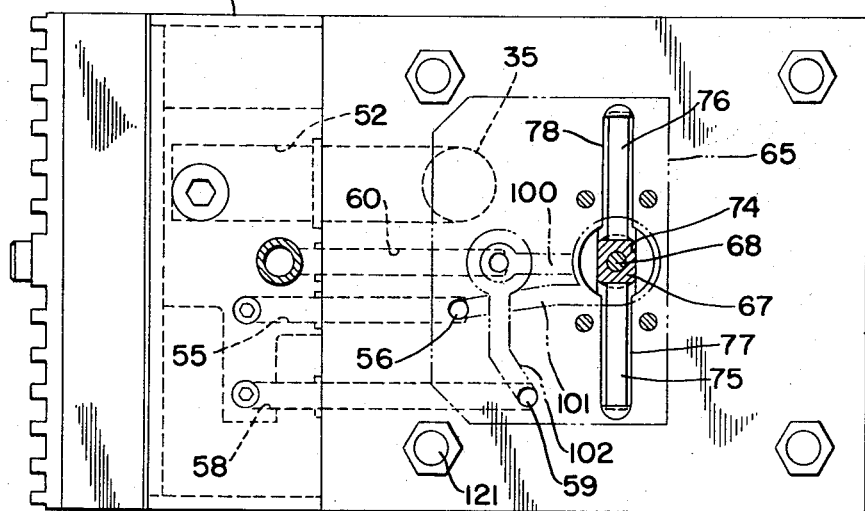
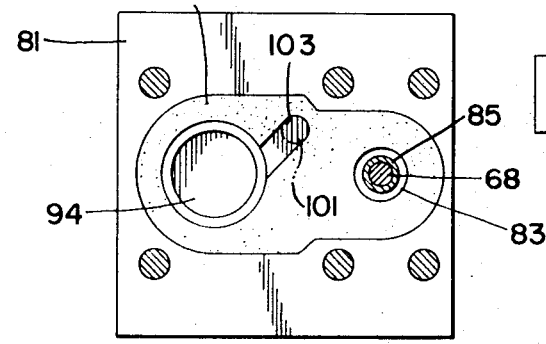
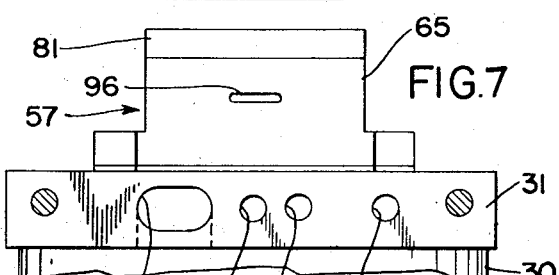

HYDRAULIC PUMP IN DOWNSTROKE

HYDRAULIC PUMP IN UPSTROKE

VALVE FOR PNEUMATIC MOTOR

CROSS REFERENCE TO RELATED APPLICATION

This application is a division of applicant's copending application Ser. No. 809,235 filed Mar. 21, 1969, now U.S. Pat. No. 3,635,125.

BACKGROUND OF THE INVENTION

This invention relates to valves for pneumatic motors, and especially to valves for controlling single cylinder, double acting air motors with reciprocating pistons used to drive associated equipment such as a pump piston. A particular aspect of the invention relates to a valve that controls a system for alternately supplying air under pressure to one side of the cylinder while exhausting air from the opposite side and vice versa.

The invention has particular utility in connection with pneumatic motors that drive double acting liquid pumps used to pump liquid paint to a spray gun.

A particular problem in the art to which our invention pertains is that of admitting air to and exhausting air from a pneumatic motor, particularly a double acting motor, with a minimum resistance to flow of air to and from the cylinder of the motor and with leak proof reversal of the flow of air at the end of each stroke of the piston to maintain as nearly as practicable a continuous, true and reversing thrust output from the piston without deleterious diminution as its speed and load is increased to a reasonably desired maximum.

While the invention will be described in connection with air motors, air is illustrative of all compressible fluids which may be employed in fluid motors controlled by our system advantageously.

As indicated above, the invention has particular utility in connection with the control of air motors for operating pumps for pumping paint or hot paint in the so-called hot airless method of spray painting. This method is disclosed and discussed in detail in U.S. Pat. Nos. 2,754,228 and 2,763,575 of James A. Bede. In this method the paint, whether hot or cold is projected from a small orifice nozzle under high pressure and the continuity of an even pressure is most desirable to obtain the best results.

Such air motors have in the past conventionally been operated by means of a four-way air valve such as that disclosed in U.S. Pat. No. 3,176,719.

A problem deriving from prior art air motors is that of an uneven or variable rate of displacement from the pump. This derives in part from an excessive dwell for the air motor piston while the valve or valves are reversing phase preparatory to driving the piston in the opposite direction. This results in a somewhat saw tooth type output for the paint being pumped which while partly compensated for by a flexible resilient hose of sufficient length, is undesirable and can prevent optimum results in many instances.

The device of the present invention reduces the difficulties indicated above and affords other features and advantages heretofore not obtainable.

SUMMARY OF THE INVENTION

An object of this invention is to provide for a quick reversal of the ports and passages in a control system for operating the piston of a single cylinder, double acting air motor.

A further object is to provide in a control system for a single cylinder, double acting air motor a valve that will cause the control system to move with rapid acceleration from one condition to another in response to a modest force and motion.

A still further object is to provide such a control system with a valve having a positive reversal which shall be substantially free of any tendency to stall in a dead center position.

Finally it is an object of the invention to provide for operating such a control system a pilot valve that is simple, efficient, free from the need of adjustments, easily maintained, easily repaired and assembled in the field, rugged in construction and economical to make and maintain.

These and other objects and advantages are accomplished in a control system for a single cylinder, double acting air motor in which pilot pressure signals, controlled by a pilot valve, are transmitted alternatingly to each of two operating valves in response to movement of the air motor system to control the position of the operating valves.

The pilot valve comprises a valve head movable between a pressure signal transmitting limit position and a closed limit position. A resilient over-center snap action means is operatively connected to the valve head to bias the valve head to each of its limit positions when in the respective limit position. A second resilient means is interposed between the resilient over-center means and the air motor piston. The second means is flexed during the terminal portion of each piston stroke to generate a force opposed to and greater than the biasing force of the resilient over-center means to force the resilient over-center means over-center whereby the valve head snaps abruptly from one limit position to the other.

BRIEF DESCRIPTION OF THE DRAWINGS

FIG. 6 is a cross-sectional view taken on the line 6—6 of FIG. 3;

FIG. 7 is a fragmentary sectional view taken on the line 7—7 of FIG. 3;

FIG. 8 is a cross-sectional view taken on the line 8—8 of FIG. 3;

FIG. 9 is a cross-sectional view taken on the line 9—9 of FIG. 3;

FIG. 10 is a cross-sectional view taken on the line 10—10 of FIG. 3;

DESCRIPTION OF THE PREFERRED EMBODIMENT

Figure 1:
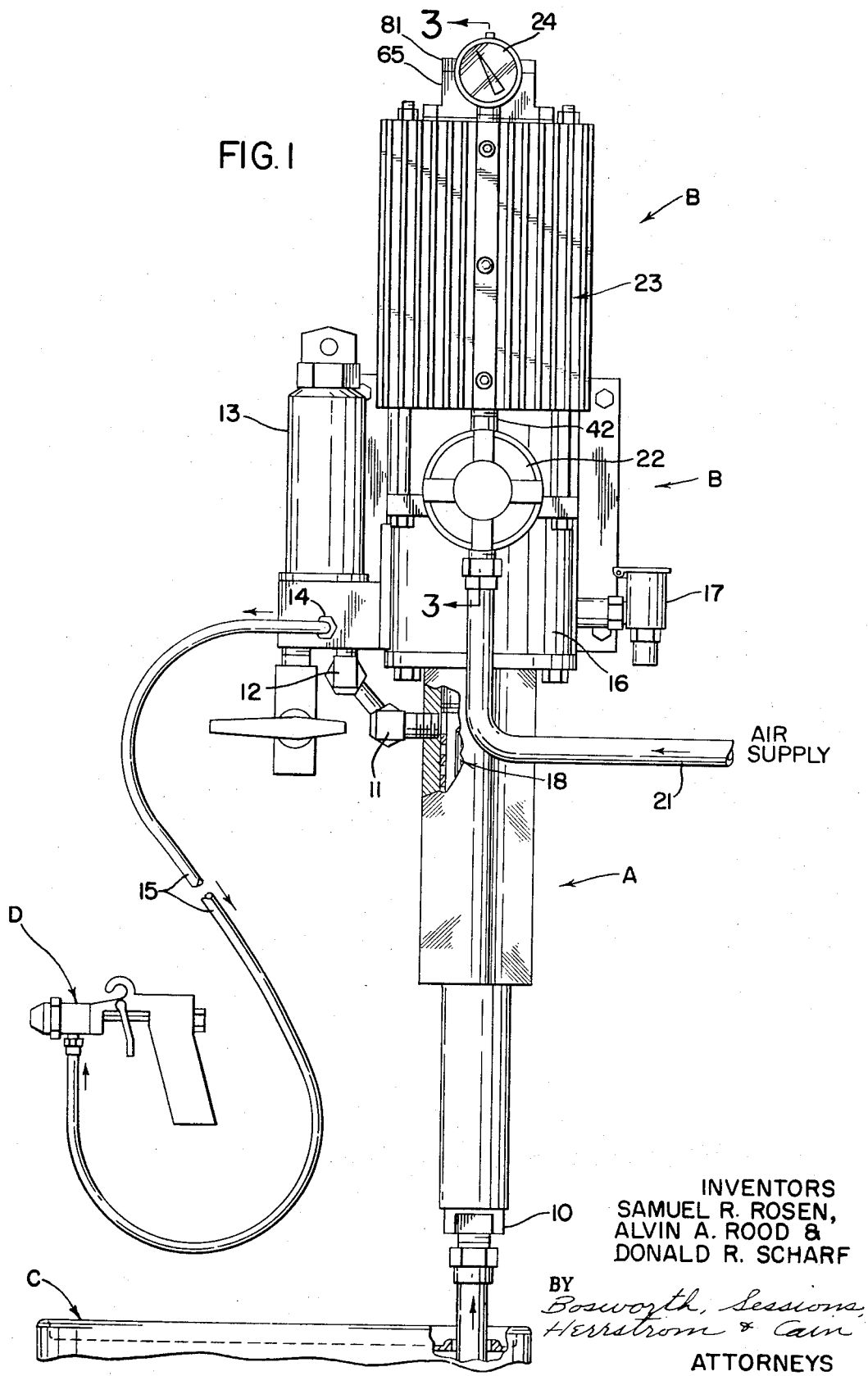
FIG. 1 is a front elevation of a double acting liquid pump and associated single cylinder, double acting air motor including the invention.
Figure 2:
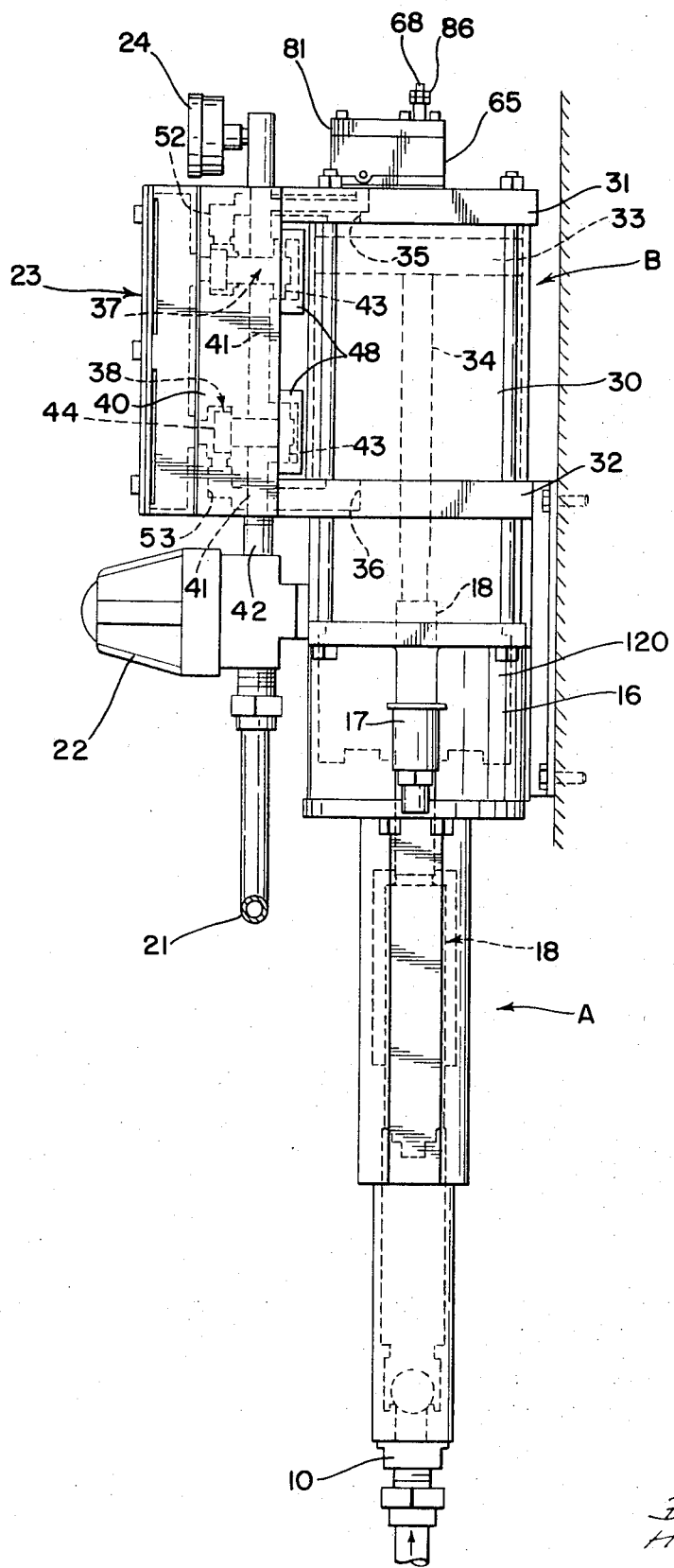
FIG. 2 is a side elevation of the pump and air motor of FIG. 1.

Referring more particularly to the drawings and initially to FIGS. 1 and 2 there is shown a paint spraying apparatus for use in spraying liquid paint according to the so-called airless method described above in the "Background of the Invention". The apparatus comprises a double acting hydraulic pump A, driven by a double acting air motor B, and adapted to pump paint from a paint pail C to a spray gun D.

Paint from the paint pail C which may be, for example, a standard size drum, enters the hydraulic pump A through an inlet fitting 10 located at the bottom thereof and exits through an outlet fitting 11. From the outlet fitting 11 the paint is directed to another fitting 12 on a paint filter 13 mounted on a pump A. The paint filter 13 serves to filter out solid particles within the paint that may be too large to pass through the nozzle of the spray gun D.

The paint from the filter 13 exits through an outlet fitting 14 to a flexible hose 15 which extends to the spray gun D. The hose 15 is preferably 25 feet or longer in order to provide some dampening effect in case of variable pressure output from the double acting pump A. The hose 15 being resilient and flexible, absorbs some energy at the peak pressure periods and thus gives a smoother more uniform pressure output to the spray gun D. The hydraulic pump A cycles at a rate typically about 40 cycles per minute and in a typical instance would have about a 4 cubic inch displacement.

Located at the upper end of the pump A is a solvent chamber 16 and an associated filler cup 17. The chamber 16 maintains a bath of paint solvent around the upper end of the pump piston 18 to dissolve any paint which may accumulate thereon and which when dry could seriously damage the packing through which the upper end of the pump piston 18 slides during its pumping travel.

Air pressure for operating the air motor B is supplied by an air pump (not shown) through a pressure line 21 which is connected to a pressure regulator valve 22 secured to the air motor B. Air is exhausted from the air motor B through a muffler 23 which serves to attenuate the noise of the escaping air. A pressure gauge 24 is located at the top of the air motor B (FIG. 2).

AIR MOTOR AND OPERATING VALVES

Figure 3:
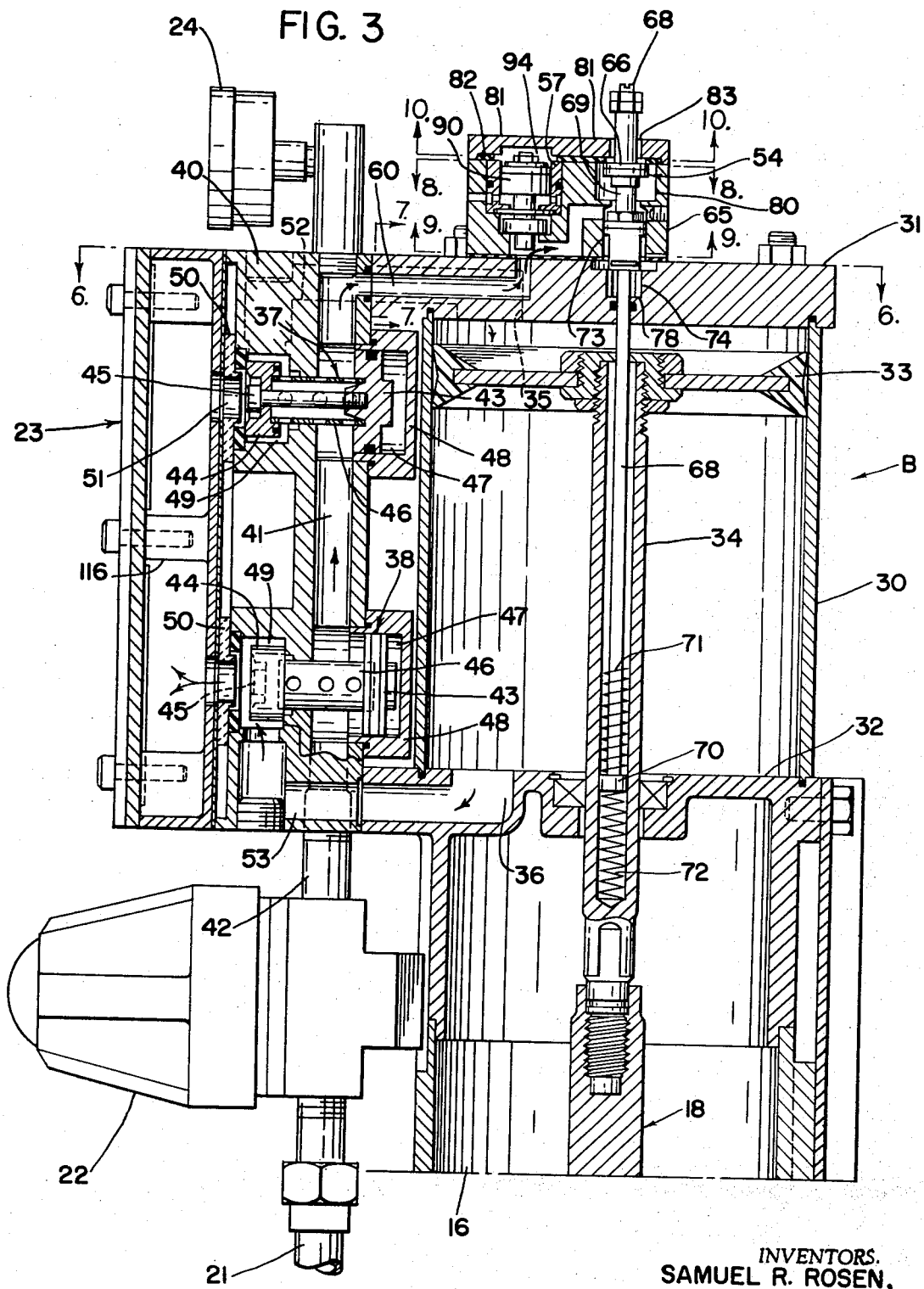
FIG. 3 is a cross-sectional view of the air motor of FIGS. 1 and 2, drawn to an enlarged scale and taken on the line 3—3 of FIG. 1.
Figure 4:
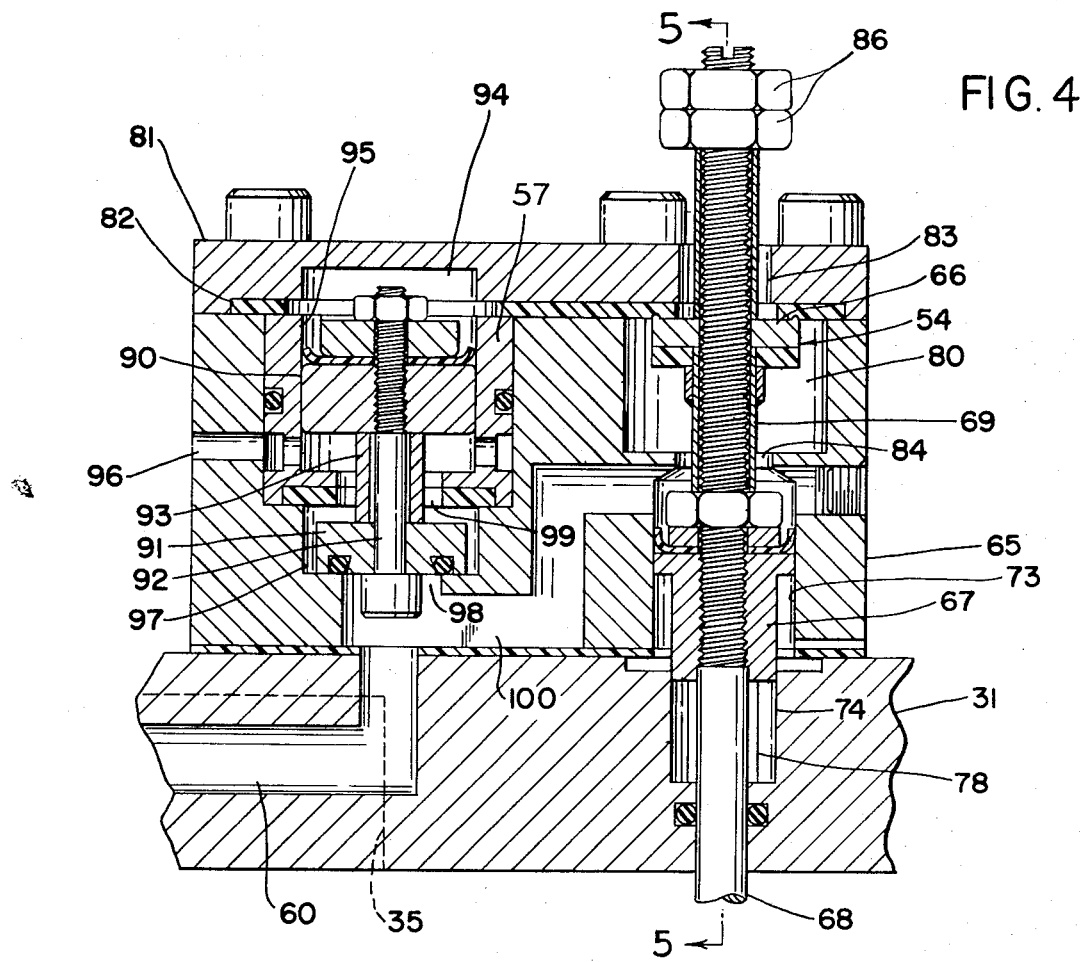
FIG. 4 is a fragmentary sectional view on a larger scale showing the pilot valve arrangement for the air motor and taken on the line 3—3 of FIG. 1.

The double acting air motor B best shown in FIG. 3 comprises an air cylinder 30 mounted between an upper cylinder head 31 and a lower cylinder head 32. The heads 31 and 32 are preferably formed of cast aluminum while the air cylinder 30 is of aluminum tube stock which has its interior surface hard anodized to accommodate frictional loads and to minimize wear. Within the cylinder 30 is a piston 33 mounted on a tubular piston rod 34.

Operating air enters the cylinder chamber and is exhausted therefrom in opposite phase through inlet-exhaust passages 35 and 36 located in the upper cylinder head 31 and lower cylinder head 32 respectively. The control of the inlet and exhaust of air from the respective ends of the cylinder chamber is accomplished by upper and lower poppet type operating valves 37 and 38 respectively (FIG. 3).

The valves 37 and 38 are located in an operating valve housing or block 40 bolted at one end to the upper cylinder head 31 and at the other end to the lower cylinder head 32. The block 40 has a central air supply passage 41 extending therethrough, which receives operating air from the pressure regulator valve 22 through an inlet fitting 42.

The valves 37 and 38 are poppet type valves essentially identical to one another and will be described and illustrated using the same numerals for corresponding parts. Each of the valves 37 and 38 is pilot operated, and has a control head 43 and an operating head 44 interconnected by a bolt 45 which serves as a valve stem. The heads 43 and 44 are spaced from one another on the bolt 45 by a perforated spacer sleeve 46 which is radially spaced from the bolt 45 and which extends transversely through the operating air pressure supply passage 41 with operating air being passed around the sleeve 46 through the perforations in the sleeve 46.

The control head 43 moves or travels within a control head chamber 47 defined by a recess in the valve block 40 and by a mating recess in an end block 48 bolted to the valve block 40 with a sealing gasket interposed therebetween.

The operating head 44 travels axially between limiting inlet and exhaust positions in an operating head chamber 49 defined by a recess in the valve block 40 and by a cover plate 50 which has exhaust ports 51 through which air may be exhausted from the cylinder through the valves 37 and 38 to the muffler 23 when the respective valve 37 or 38 is in its exhaust position. (See valve 38 in FIG. 3)

The valves control the inlet and exhaust of air to the cylinders through inlet exhaust passages 52 and 53 respectively formed in the valve block 40 and which communicate between the operating head chambers 49 and the inlet-exhaust passages 35 and 36 respectively in the upper cylinder head 31 and lower cylinder head 32.

The position of the operating valve 37 is controlled by a pilot valve 54 which transmits a pressure signal to the chamber 47 of the respective control head 43 through a pilot air passage 55 in the valve block 40 and a mating pilot valve passage 56 in the upper cylinder head 31. In like manner the position of the operating valve 38 is controlled by a pilot relay valve 57 which transmits a pressure signal to the chamber 47 of the respective control head 43 through a pilot relay air passage 58 in the valve block 40 and a mating pilot relay air passage 59 in the upper cylinder head 31.

While the pressures used to transmit pressure signals to the operating valves 37 and 38, and the pressure in the operating air supply passage 41 for operating the piston 33 are essentially the same, the operating force derives from the area differential between the outward face of the control head 43 and its inward face. The effective area against which air pressure acts on the inner face is reduced by the valve stem so that equal fluid pressures on opposite sides of the control head will result in greater force in the direction tending to move the valve to the left as viewed in FIG. 3. Accordingly when pressure is supplied to a control head chamber 47 at the outward side of the respective control head 43, the respective operating head 44 will be moved to a position sealing the respective exhaust port 51 while permitting operating air pressure to be transmitted through the perforations in the spacer sleeve 46, into the operating head chamber 49 and out through the respective inlet-exhaust passage 52 or 53 in the valve block 40.

When the pilot pressure signal to a control head chamber 47 at the outward side of the respective control head 43 is cut off however, operated air pressure from the main air supply passage 41 will quickly pop the respective control head 43 and operating head 44 to the right as riewed in FIG. 3 where the operating head 44 will seal the chamber 49 from the main air supply passage 41 while at the same time opening the respective exhaust port 51 so that air may be exhausted to the muffler 23 from the inlet-exhaust passage 52 or 53 respectively through the operating head chamber 49.

Accordingly, the operating heads 44 seat in two sealing positions, one of which is against the cover plate 50 for the valve block 40 to seal the exhaust port 51 and the other of which is against the inner wall of the chamber 49 formed by the valve block 40 to seal the chamber from the main air supply passage 41.

As will be more clearly described below, the pilot valve and pilot relay valve pressure signals are transmitted in opposite phase to the valves 37 and 38 respectively so that correspondingly the positions of the operating heads 44 will be in reverse phase with one another and accordingly operating pressure will be supplied to one end of the cylinder chamber while being exhausted from the other end and vice versa during the operating of the air motor B.

PILOT AND PILOT RELAY VALVES

As indicated above, the air pressure signals for operating the two operating valves 37 and 38 in reverse phase are transmitted by a pilot valve 54 and a pilot relay valve 57. The valves 54 and 57 are best illustrated in FIGS. 4 to 10. Both the valves 54 and 57 are housed in a pilot valve block 65 which is bolted to the top face of the upper cylinder head 31 with suitable seals interposed therebetween. The pilot valve 54 is operated mechanically in response to movement of the piston 33 and it comprises an operating head 66 and a valve guide 67 both of which are received on a threaded valve stem 68 and spaced from one another by a spacer sleeve 69. The valve stem 68 extends downwardly into the interior of the tubular piston rod 34 and has a plunger 70 slidably received within the piston rod 34 near the lower end of the cylinder chamber.

On opposite sides of the plunger 70 are coil springs 71 and 72 respectively, the coil spring 71 being located and adapted to be compressed between the plunger 70 and a radial flange of the piston 33 adjacent the upper end of the tubular piston rod 34. Accordingly, energy is stored by the spring 71 during the terminal portion of the piston's retraction travel.

The coil spring 72 is located and adapted to be compressed between the plunger 70 and the bottom of the axial passage within the tubular piston rod 34 during the terminal portion of the extension travel of the piston 33. The stored energy is used to overcome detent force biasing the valve 54 at the valve guide 67 to one or the other of the two detent positions.

The pilot valve 54 is biased to its two detent positions by an over-center resilient detent means which acts on the valve guide 67 which in turn travels in a valve guide passage 73 defined by the pilot valve block 65 and by a recess 74 in the upper cylinder head 31 through which the valve stem 68 extends.

Figure 5:
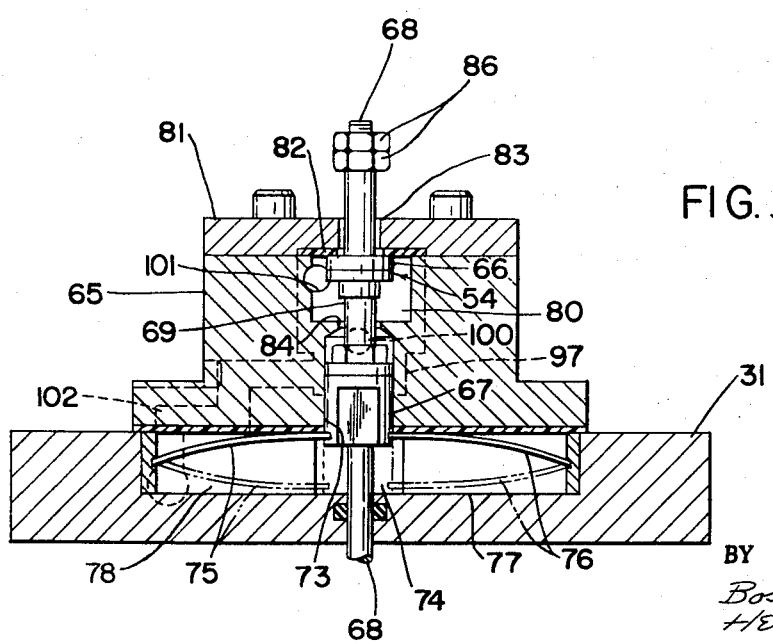
FIG. 5 is a fragmentary sectional view taken on the line 5—5 of FIG. 4.

The resilient over-center detent means is in the form of two opposed leaf springs 75 and 76 respectively which are mounted in an elastically buckled or flexed condition in slots 77 and 78 in the upper cylinder head 31 (FIGS. 5 and 6). The springs 75 and 76 bear between the ends of the slots 77 and 78 and lateral grooves formed in the valve guide 67. The springs 75 and 76 are so arranged as to exert a maximum detent force in an axial direction against the valve guide 67 when the valve is in either one of its detent positions.

When moving from one detent position to the other the springs 75 and 76 move through an over-center position where the axial force applied diminishes to zero. Accordingly, energy will be stored in the coil springs 71 and 72 during the terminal portion of piston extension or retraction travel until sufficient force is available to overcome the axial force of the leaf springs 75 and 76 as well as the force of friction resisting valve movement. When this force level in the coil springs 71 and 72 is reached the valve 54 begins to move and the motion starts to reduce the axial detent force exerted by the leaf springs. Accordingly, the force exerted by the leaf springs 75 and 76 is progressively reduced and the valve very quickly and abruptly snaps from one detent position to the other.

The pilot valve operating head 66 travels in a chamber 80 defined by the pilot valve block 65 and a pilot valve cover plate 81 (FIGS. 4 and 10) which is bolted to the block 65 with a sealing gasket 82 interposed therebetween. The chamber 80 has an axial exhaust port 83 defined by the plate 81.

The operating head 66 is movable between two sealing positions in one of which it seals the exhaust port 83 and in the other of which it seals an inlet port 84 in the opposite end of the chamber through which main supply pressure air may be admitted when the port 84 is open. Nut 86 retains pilot valve operating head 66 and valve guide 67 to the valve stem 68.

When the operating head 66 is in its open position a pressure signal is transmitted to the control head chamber 47 of the upper operating valve 37 to open the valve 37 and transmit air pressure to the upper end of the cylinder chamber. Also a pressure signal is simultaneously transmitted to the pilot relay valve 57.

The pilot relay valve 57 comprises a control head 90 and an operating head 91 connected to one another by a bolt or valve stem 92 and spaced apart by a spacer sleeve 93 which fits around the stem 92. The control head 90 moves between two positions in a control head chamber 94 defined by a porting sleeve 95 received in the pilot valve block 65 and by the cover plate 81. An exhaust port 96 extends through the porting sleeve 95 and the block 65 to permit air to be exhausted when the valve is in the position shown in FIG. 4.

The pilot relay valve operating head 91 travels in an operating head chamber 97 defined by the pilot valve block 65 and the lower end of the porting sleeve 95. The chamber 97 has a pressure inlet port 98 at its lower end which is sealed when the operating head 91 is in one position, and the porting sleeve 95 defines an exhaust port 99 at the upper end of the chamber 97 which is sealed when the operating head is in its other position. Referring to FIG. 8 it will be seen that the pilot relay valve 57 will be in its open position, in other words, opening the inlet port 98 whenever the pilot valve 54 is in its closed position closing its inlet port 84. Accordingly, the pilot relay valve 57 transmits a pressure signal in opposite phase with the pressure signal from the pilot valve 54.

Operating pressure is supplied to the valves 54 and 57 through a passage 100 in the pilot valve block 65, the passage 100 being in communication with the main supply air passage 60 in the upper cylinder head 31. A pilot pressure signal is transmitted to the control head chamber 47 of the operating valve 37 from the pilot valve 54 through a passage 101 in the pilot valve block 65, the passage 101 being in registration with the pilot valve passage 56 in the upper cylinder head 31. The pilot relay valve 57 transmits its pressure signal to the control head chamber 47 of the operating valve 38 through still another passage 102 in the pilot valve block 65, the passage 102 being in registration with the pilot relay valve passage 59 in the upper cylinder head 31. The pressure signal from the pilot valve 54 to the control head chamber 94 of the pilot relay valve 57 is transmitted through a passage 103 which is in communication with the pilot valve passage 101.

Figure 11:
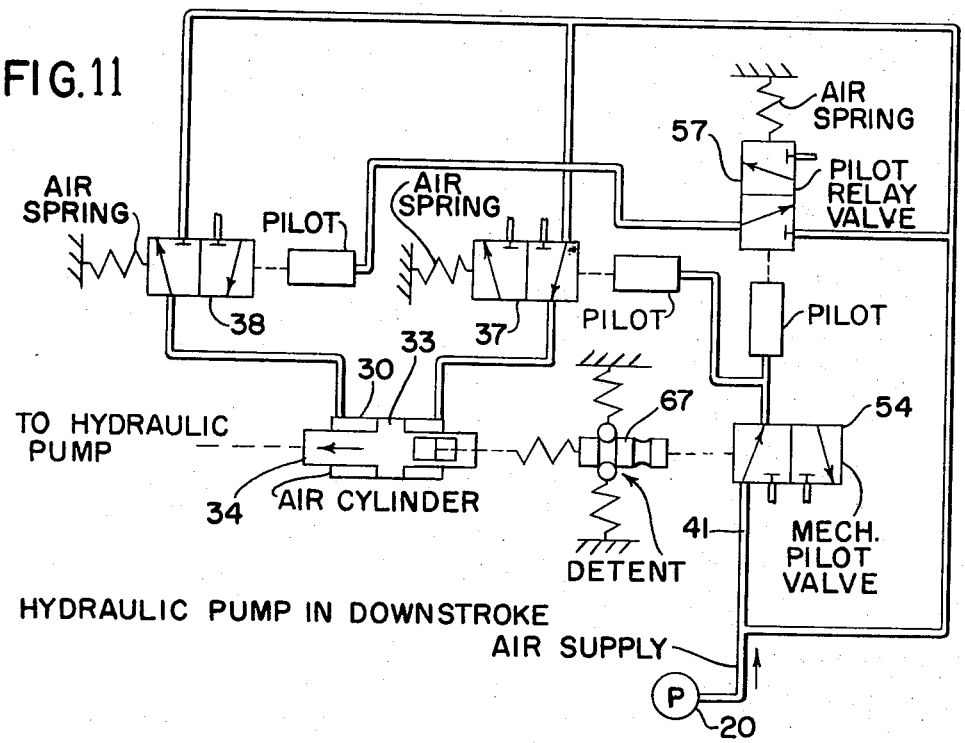
FIG. 11 is a schematic diagram of the pneumatic control system for the air motor showing the piston in its extension stroke.

The control and operation of the air motor B is best illustrated and described with reference to FIGS. 11 and 12 which present schematically the two conditions of the operating valves 37 and 38, the pilot valve 54 and the pilot relay valve 57. FIG. 11 shows the piston 33 about midway through its downward retraction travel and it will be seen that the pilot valve 54 is in its upward position with the valve guide 67 being urged to the corresponding detent position by the over-center leaf springs 75 and 76. The pilot valve 54 in this position transmits a pressure signal to the control head 43 of the upper operating valve 37 and another simultaneous and corresponding pressure signal to the control head 90 of the pilot relay valve 57. Accordingly, the operating head 91 of the pilot relay valve 57 is moved to the closed position to cut off pilot pressure to the control head 43 of the lower operating valve 38.

Thus, the control head 43 of the upper operating valve 37 moves the respective operating head 44 to the pressure inlet position so that air pressure is supplied to the upper end of the air motor cylinder chamber. Since the pilot relay valve 57 is moved to its closed position, no pilot pressure signal is transmitted and air in the chamber 97 is vented. Accordingly, the control head 43 of the lower operating valve 38 and the operating head 44 thereof are moved to the exhaust position so that air is exhausted from the lower end of the air motor cylinder chamber. It will be seen that operating air pressure acting on the inward side of the control head 43 of the lower operating valve 38 forces the operating head positively into its exhaust position, the force being derived from the pressure differential since there is no positive pressure acting on the outward side of the control head 43.

As the piston 33 reaches the terminal part of its downward retraction movement the coil spring 71 begins to be compressed between the plunger 70 and the upper end of the piston rod 34. Accordingly, energy is stored in the coil spring 71 to provide a progressively increasing force until the force is sufficient to overcome the resisting force of the over-center leaf springs 75 and 76 as well as friction. As this occurs, the valve guide 67 moves downwardly and as described more specifically above, very abruptly moves past its over-center position into its opposite or downward detent position wherein the leaf springs exert a biasing force in the downward direction.

Figure 12:
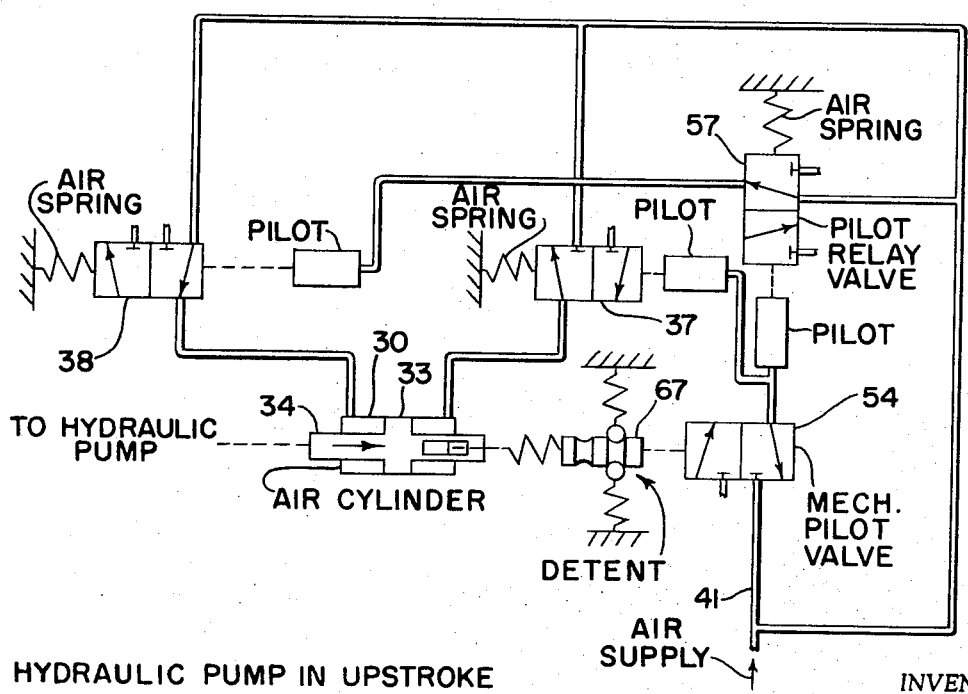
FIG. 12 is a schematic diagram of the pneumatic control system, similar to FIG. 11 but showing the piston in the retraction stroke.

The condition of the system at this time is best illustrated diagrammatically in FIG. 12. The pilot valve 54 having been moved to its downward detent position, the pressure signal to the control head 43 of the upper operating cylinder 37 is cut off and vented as well as the pressure signal to the pilot relay valve 57. Thus, the pilot relay valve 57 is suddenly and abruptly forced by operating air pressure acting against the inside face of the control head 90 to the open position thus transmitting a pressure signal to the control head 43 of the lower operating valve 38.

Accordingly, the operating head 44 of the upper operating valve 37 is moved to its exhaust position so that air is exhausted from the upper end of the cylinder chamber while the operating head of the lower operating valve 38 is moved to its pressure transmitting position and operating pressure is supplied through the valve 38 to the lower end of the air motor cylinder chamber. The resulting pressure moves the piston 33 through its upward extension stroke travel to a point where near the terminal portion of its extension travel the coil spring 72 begins to be compressed between the plunger 70 and the floor of the passage in the piston rod 34 until sufficient energy is stored to supply a force to overcome the over-center leaf springs 75 and 76. As this occurs the pilot valve 54 abruptly snaps to its opposite position to transmit pilot pressure signals to the upper operating valve 37 and the pilot relay valve 57 so that the valve condition changes to that discussed above with respect to FIG. 11.

While the invention has been shown and described with reference to a specific embodiment thereof this is for the purpose of illustration rather than limitation and other modifications and variations will be apparent to those skilled in the art upon reading of the specification, all with the intended spirit and scope of the invention. Accordingly the patent is not to be limited to the form specifically illustrated and described nor in any manner that is inconsistent with the extent to which the progress in the art has been advanced by the invention.

What is claimed is:

1. Valve apparatus comprising a valve head movable between two limit positions, diametrically opposed leaf springs operatively connected to said valve head, said leaf springs being buckled in one or the other of two opposite positions to bias said valve head to one or the other of its limit positions when said valve head is in its respective limit position, said leaf springs being movable over center from one to the other of said positions to snap said valve head from one to the other of said limit positions, first and second resilient means operatively connected to said leaf springs and adapted to be flexed alternatingly in opposite directions to generate force sufficient to overcome the biasing force of said leaf springs and allow said leaf springs to snap abruptly from one position to the other and to force said valve head abruptly from one position to the other, and means operatively connected to said first and second resilient means for flexing said resilient means in opposite directions.

2. In a fluid motor having a cylinder, a piston that reciprocates within said cylinder and a piston rod connected to said piston, a valve for controlling the transmission of fluid to and from said cylinder comprising a valve head movable between two limit positions, diametrically opposed leaf springs operatively connected to said valve head, said leaf springs being buckled in one or the other of two opposite positions to bias said valve head to one or the other of its limit positions when said valve head is in its respective limit position, said leaf springs being movable over center from one to the other of said positions to snap said valve head from one to the other of said limit positions, a valve stem extending from said valve head operatively connected to said piston rod, first and second spring means interposed between said stem and said piston rod, said first and second springs being flexed alternatingly in opposite directions during the terminal portions of said piston's extension and retraction travel to generate force sufficient to overcome the biasing force of said leaf springs and allow said leaf springs to snap abruptly from one position to the other and to move said valve head abruptly from one position to the other.

* * * * *